(12) United States Patent
Tachikawa et al.

(10) Patent No.: US 6,375,863 B1
(45) Date of Patent: Apr. 23, 2002

(54) THERMOPLASTIC RESIN COMPOSITION, PRODUCTION THEREOF, AND MOLDED ARTICLE THEREOF

(75) Inventors: Kouji Tachikawa, Toyota; Hideyuki Umetsu; Yoshiki Makabe, both of Nagoya, all of (JP)

(73) Assignee: Toray Industries, Inc. (JP)

( * ) Notice: Subject to any disclaimer, the term of this patent is extended or adjusted under 35 U.S.C. 154(b) by 0 days.

(21) Appl. No.: 09/420,703

(22) Filed: Oct. 19, 1999

(30) Foreign Application Priority Data

Oct. 30, 1998 (JP) .......................... 10-311065
Mar. 8, 1999 (JP) .......................... 11-060813

(51) Int. Cl.$^7$ .................. C09K 19/38; C08L 71/10; C08K 5/06; B32B 27/08; B29C 71/00
(52) U.S. Cl. .................. 252/299.01; 264/30; 264/234; 428/480; 428/483; 428/913; 524/540; 524/755; 524/757
(58) Field of Search .............. 252/299.01; 428/480, 428/483, 913; 264/30, 234; 524/540, 755, 757

(56) References Cited

U.S. PATENT DOCUMENTS 5,632,945 A * 5/1997 Sasaki et al. ............ 264/210.2
6,010,760 A * 1/2000 Miyazaki et al. ........ 428/36.92

FOREIGN PATENT DOCUMENTS

| EP | 0 030 417 | 6/1981 |
| EP | 0 217 563 | 4/1987 |
| EP | 0 605 157 | 7/1994 |

OTHER PUBLICATIONS

He, Jiasong; Bu, Wesheng; and Zhang Hongzhi, Factors Influencing Microstructure Formation in Polyblends Containing Liquid Crystalline Polymers, *Polymer Engineering & Science*, 35 (1995) Mid–November, No. 21, pp. 1695–1704.

Lee, Sukmin; Mather, Patrick T.; and Pearson, Dale S., Phase Behavior and Rheology of Blends Containing Polycarbonate and a Thermotropic Polyester, *Journal of Applied Polymer Science*, 59 (1996) Jan. 10, No. 2, pp. 243–250.

Su, Koe–Fu and Wei, Kung–Hwa, A Study on Blends of Liquid Crystalline Copolyesters with Polycarbonate. I. Compatability by Transesterification, *Journal of Applied Polymer Science*, (1995) Apr. 4, No. 1, pp. 79–89.

* cited by examiner

*Primary Examiner*—Shean C. Wu
(74) *Attorney, Agent, or Firm*—Schnader Harrison Segal & Lewis LLP

(57) ABSTRACT

A thermoplastic resin composition which comprises 100 parts by weight of thermoplastic resin as component (A) which is at least one species selected styrene resin, polycarbonate resin, and polyphenylene ether resin, and 0.5–100 parts by weigh of liquid crystalline polymer as component (B), said thermoplastic resin as component (A) having a glass transition point the rate of change of which satisfies the equation (1) below.

Rate of change (%)=$|(Tg_A-Tg_T)/Tg_A|\times 100 \leq 5$ (1)

where $Tg_A$ is the glass transition point of the thermoplastic resin as component (A), and $Tg_T$ is the glass transition point attributable to the thermoplastic resin as component (A) in the resin composition.

9 Claims, No Drawings

THERMOPLASTIC RESIN COMPOSITION, PRODUCTION THEREOF, AND MOLDED ARTICLE THEREOF

BACKGROUND OF THE INVENTION

1. Field of the Invention

The present invention relates to a thermoplastic resin composition which exhibits improved flowability and metering stability at the time of molding and yields molded articles having improved impact resistance, heat resistance, chemical resistance, fatigue properties, and anisotropy. The present invention relates also to a process for production of said resin composition and a molded article of said resin composition.

2. Description of Related Arts

There are a variety of thermoplastic resins, such as polystyrene, polycarbonate, and polyphenylene ether, which find general use as an injection molding material for machine parts, electric and electronic parts, and automotive parts because of their outstanding characteristic properties. The recent advance in technology demands molded articles with intricate shapes and hence demands resin compositions with improved flowability.

One way to improve the flowability and mechanical properties of thermoplastic resins is by alloying with an optically anisotropic liquid crystalline polymer which is characterized by a parallel arrangement of molecular chains. Several alloying technologies have been disclosed in Japanese Patent Laid-open Nos. 102257/1990, 47861/1991, 70700/1993, 112709/1993, 200129/1994, 331051/1995, and 12744/1997. Their disclosures are outlined below.

Japanese Patent Laid-open Nos. 102257/1990 and 47861/1991 disclose a thermoplastic resin composition which is incorporated with a liquid crystalline polymer having an adequately low heat distortion temperature so as to improve mechanical properties, heat resistance, and dimensional stability.

Japanese Patent Laid-open No. 70700/1993 discloses a thermoplastic resin composition consisting of a liquid crystalline polymer and a thermoplastic resin capable of molding at a temperature lower than the temperature at which the liquid crystalline polymer begins to flow under stress, said resin composition exhibiting improved physical properties when stretched owing to the orientation of the dispersed particles of the liquid crystalline polymer.

Japanese Patent Laid-open No. 112709/1993 discloses a molding resin composition consisting of polycarbonate resin (as the matrix resin) and a liquid crystalline polymer having a melting point higher than that of polycarbonate resin, said resin composition yielding molded articles with a minimum of loss in strength and stiffness after recycling, owing to the orientation of the dispersed particles of the liquid crystalline polymer.

Japanese Patent Laid-open No. 200129/1994 discloses a thermoplastic resin composition consisting of a polycarbonate resin having many terminal phenolic hydroxyl groups and a liquid crystalline polymer, said resin composition having improved delamination resistance owing to the mutual action of the two components.

Japanese Patent Laid-open No. 331051/1995 discloses a thermoplastic resin composition which consists of a polycarbonate resin having many terminal phenolic hydroxyl groups, a flame retardant, and a liquid crystalline polymer, said resin composition having improved flame retardance.

Japanese Patent Laid-open No. 12744/1997 discloses a film formed from a liquid crystalline polyester resin composition in which the liquid crystalline polymer incorporated therein constitutes a continuous phase.

The above-mentioned resin compositions certainly contribute to strength and stiffness; however, they still have their respective disadvantages as follows.

Japanese Patent Laid-open Nos. 200129/1994 and 331051/1995. The resin composition is inferior in impact resistance, flowability, and chemical resistance to the polycarbonate used alone because the polycarbonate, which has many terminal phenolic hydroxyl groups, reacts strongly with the liquid crystalline polymer, thereby weakening its effect and giving rise to fine dispersed particles.

Japanese Patent Laid-open Nos. 70700/1993 and 112709/1993. The resin composition is poor in chemical resistance and heat resistance, despite slight improvement in mechanical properties, because the polycarbonate resin is denatured during melt-mixing. This denaturation is due to the fact that the polycarbonate resin and the liquid crystalline polymer are heated once for melt-mixing at a temperature higher than the melting point of the liquid crystalline polymer, so that the particles of the liquid crystalline resin are oriented. Melt-mixing in this way brings about excessive reactions between the components. Good chemical resistance is essential for the resin composition to be used for machine parts, automotive parts, and electric and electronic parts, which are exposed to oils (engine oil, brake oil, gear oil, etc.), chemicals (window washer, battery liquid, etc.), and washing agents and organic solvents (used during processing).

Japanese Patent Laid-open Nos. 112709/1993, 102257/1990, 47861/1991, and 12744/1997. The resin composition is poor in flowability and chemical resistance because of excess reactions between the thermoplastic resin and the liquid crystalline polymer. Such reactions take place when melt-mixing is carried out at a temperature higher than the melting point of the liquid crystalline polymer.

SUMMARY OF THE INVENTION

It is an object of the present invention to provide a thermoplastic resin composition which exhibits good flowability and metering stability at the time of molding. It is another object of the present invention to provide a molded article of said resin composition which has improved impact resistance, heat resistance, chemical resistance, fatigue properties, and anisotropy. The present invention covers a thermoplastic resin composition as follows.

(1) A thermoplastic resin composition which comprises 100 parts by weight of thermoplastic resin as component (A) which is at least one species selected from styrene resin, polycarbonate resin, and polyphenylene ether resin, and 0.5–100 parts by weight of liquid crystalline polymer as component (B), said thermoplastic resin as component (A) having a glass transition point the rate of change of which satisfies the equation (1) below.

$$\text{Rate of change } (\%) = |(Tg_A - Tg_T)/Tg_A| \times 100 \leq 5 \tag{1}$$

where $Tg_A$ is the glass transition point of the thermoplastic resin as component (A), and $Tg_T$ is the glass transition point attributable to the thermoplastic resin as component (A) in the resin composition.

$$\text{Rate of change (\%)} = |(Tg_A - Tg_T)/Tg_A| \times 100 \leq 5 \quad (1)$$

where $Tg_A$ is the glass transition point of the thermoplastic resin as component (A), and $Tg_T$ is the glass transition point attributable to the thermoplastic resin as component (A) in the resin composition.

The preferred embodiments of the present invention are given below.

(2) A thermoplastic resin composition as defined in paragraph (1) above, which contains the liquid crystalline polymer dispersed therein in the form of particles having a number-average particle diameter of 0.5–5 μm.

(3) A thermoplastic resin composition as defined in paragraph (1) or (2) above, which contains the liquid crystalline polymer dispersed therein in the form of particles having an aspect ratio (major axis/minor axis) smaller than 3.

(4) A thermoplastic resin composition as defined in any of paragraphs (1) to (3) above, in which the thermoplastic resin as component (A) includes a polycarbonate resin characterized by its ratio $(E_P)/(E_N)$ smaller than 1/20, where $E_P$ and $E_N$ denote the respective amounts (in equivalent) of phenolic terminal groups and non-phenolic terminal groups in the polycarbonate resin.

(5) A thermoplastic resin composition as defined in any of paragraphs (1) to (4) above, wherein the liquid crystalline polymer as component (B) is a liquid crystalline polyester composed of the structural units represented by the formulas (I), (II), (III), and (IV) below.

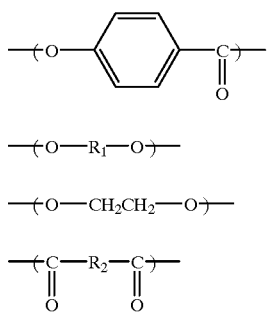

(I)

(II)

(III)

(IV)

where $R_1$ is one or more groups selected from

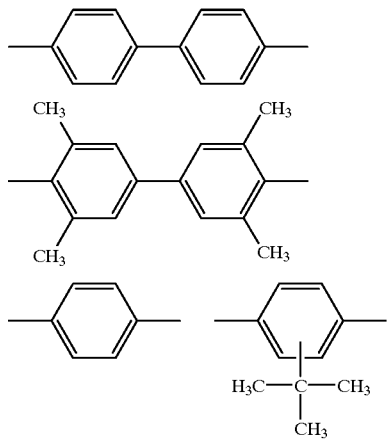

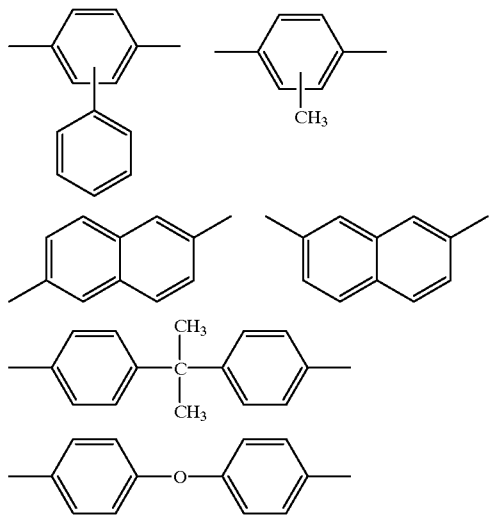

and $R_2$ is one or more groups selected from

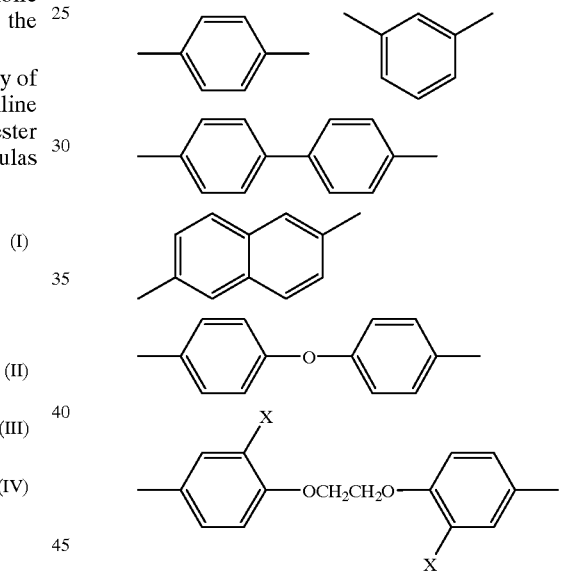

X denotes a hydrogen atom or chlorine atom.

(6) A thermoplastic resin composition as defined in any of paragraphs (1) to (5) above, which further comprises 0.5–300 parts by weight of filler for 100 parts by weight of the total amount of the thermoplastic resin as component (A) and the liquid crystalline polymer as component (B).

(7) A thermoplastic resin composition as defined in paragraph (6) above, wherein the filler is carbon fiber.

The present invention also covers the following.

(8) A process for producing a thermoplastic resin composition defined in any of paragraphs (1) to (7) above, said process comprising melt-mixing a thermoplastic resin as component (A) and a liquid crystalline resin as component (B) (and a filler as an optional component) at a temperature lower than the melting point of the liquid crystalline polymer and higher than the temperature at which the liquid crystalline polymer begins to flow under stress.

(9) A process for producing a molded article of the thermoplastic resin composition as defined in any of paragraphs (1) to (7) above, said process comprising melt-processing a thermoplastic resin as component (A), a liquid crystalline resin as component (B), and a filler at a temperature lower than the melting point of the liquid crystalline polymer and higher than the temperature at which the liquid crystalline polymer begins to flow under stress.

(10) A molded article of the thermoplastic resin composition as defined in any of paragraphs (1) to (7) above, said molded article being a machine part, electric and electronic part, or automotive part.

Another p referred embodiment of the present invention is given below.

(11) A molded article of the thermoplastic resin composition as defined in any of paragraphs (1) to (7) above, said molded article having a plate-like part or box-like part and also having a thin-wall part (thinner than 1.2 mm) which accounts for more than 10% of the entire surface area thereof.

DESCRIPTION OF THE PREFERRED EMBODIMENTS

The thermoplastic resin composition of the present invention contains a thermoplastic resin as component (A). This thermoplastic resin is one or more species selected from styrene resin, polycarbonate resin, and polyphenylene ether resin.

The styrene resin is one which is composed of structural units of styrene and/or derivative thereof (which are collectively referred to as aromatic vinyl monomer). An example of the structural unit is represented by the formula (7) below.

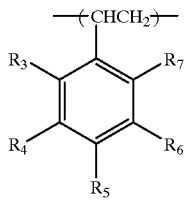

where $R_3$ to $R_7$ may be identical or different, each denoting hydrogen, halogen (such as chlorine), $C_{1-10}$ aliphatic group, aromatic group, sulfonyl group, or nitro group.

Examples of $R_3$ to $R_7$ include hydrogen and chlorine and those groups of methyl, ethyl, isopropyl, allyl, butyl, phenylbenzyl, methylbenzyl, chloromethyl, cyanomethyl, cyanomethoxy, ethoxy, phenoxy, and nitro.

Preferred examples of the derivative of styrene include α-methylstyrene, vinyltoluene, p-methylstyrene, and p-t-butylstyrene. Styrene and α-methylstyrene are preferred monomers for the styrene resin. They maybe used in combination with one another.

Examples of the styrene resin include styrene (co)polymer and rubber-reinforced styrene (co)polymer. Examples of the styrene (co)polymer include polymers obtained by polymerization from one or more kinds of aromatic vinyl monomer and polymers obtained by copolymerization from one or more kinds of aromatic vinyl monomer and one or more kinds of copolymerizable monomer. Examples of the rubber-reinforced styrene (co)polymer include rubber-reinforced graft polymer obtained by graft polymerization from a rubbery polymer and one or more kinds of aromatic vinyl monomer and rubber-reinforced graft copolymer obtained by graft copolymerization from a rubbery polymer and one or more kinds of aromatic vinyl monomer and one or more kinds of copolymerizable monomer.

The monomer copolymerizable with the aromatic vinyl monomer includes, for example, (meth)acrylic ester and vinyl cyanide.

The (meth)acrylic ester includes, for example, methyl methacrylate and ethyl methacrylate, with the former being preferable. The vinyl cyanide includes, for example, acrylonitrile and methacrylonitrile.

The rubbery-polymer includes, for example, diene rubber, such as butadiene rubber, styrene-butadiene copolymer rubber (SBR), and acrylonitrile-butadiene copolymer rubber (NBR), acryl rubber, such as polybutyl acrylate, and polyolefin rubber, such as ethylene-propylene-nonconjugated dine terpolymer rubber (EPDM), with the last one being preferable.

The rubber-reinforced styrene (co)polymer is explained in more detail as follows. It is composed of two polymers. The first polymer (i) is a graft (co)polymer obtained by graft polymerization from a rubbery polymer (a) and at least one species selected from aromatic vinyl compounds (b) or at least one species selected from methacrylic esters (c) and vinyl cyanide compounds (d). The second polymer (ii) is a (co)polymer obtained by polymerization from at least one vinyl compound selected from aromatic vinyl compound (b) and methacrylic ester (c), with or without vinyl cyanide compound (d).

In the polymer (i) not containing the vinyl cyanide compound (d), the amount of the comonomers (b) and (c) should be 5–80 wt % of the amount of the rubbery polymer (a). In the polymer (ii) containing the vinyl cyanide compound (d), the amount of the comonomers (b) and (c) should be 50–97 wt % and the amount of the vinyl cyanide compound (d) should be 3–50 wt % of the amount of the rubbery polymer (a).

The polymer (i) maybe produced by any known polymerization process, such as bulk suspension polymerization, emulsion polymerization, solution polymerization, and bulk-suspension polymerization.

The polymer (ii) may contain vinyl cyanide compound (d) as comonomer in an amount of 3–50 wt %.

The polymer (ii) may be produced by any known polymerization process, such as bulk suspension polymerization, emulsion polymerization, solution polymerization, and bulk-suspension polymerization.

The above-mentioned graft (co)polymer contains the polymer (i) as an essential component and the polymer (ii) as an optional component in an adequate amount.

Preferred examples of the styrene resin in the present invention include styrene polymer, such as PS (polystyrene), rubber-reinforced styrene polymer, such as HIPS (high-impact polystyrene), styrene copolymer, such as AS (acrylonitrile-styrene copolymer), and rubber-reinforced (co) polymer, such as AES (acrylonitrile/ethylene-propylene-nonconjugated diene rubber/styrene copolymer), ABS (acrylonitrile-butadiene-styrene copolymer), and MBS (methyl methacrylate-butadiene-styrene copolymer). Of these examples, PS, As, and ABS are particularly desirable. The polystyrene resin may be used regardless of the structure and amount of terminal groups. The polystyrene may be modified with an adequate amount of a compound, such as maleic anhydride and glycidyl methacrylate, which has reactive groups. Such a modified polystyrene should be used in an amount so that, when mixed with the liquid crystalline polymer, it meets the requirement that the rate of change of the glass transition point satisfies the equation 1 above.

The polycarbonate resin in the present invention is an aromatic homopolycarbonate or copolycarbonate having a carbonate linkage which is obtained by reaction between an aromatic divalent phenol compound and phosgene or carbonate ester. In order that it has a glass transition point the rate of change of which is within the range specified in the present invention, it is characterized by its ratio $(E_P)/(E_N)$ smaller than 1/20, where $E_P$ and $E_N$ denote the respective amounts (in equivalent) of phenolic terminal groups and non-phenolic terminal groups which are formed by reaction between an aromatic. divalent phenolic compound and phosgene. The ratio $(E_P)/(E_N)$ should preferably be smaller than 1/40, more preferably smaller than 1/70.

The terminal groups of the polycarbonate may be determined in the following manner. A sample of polycarbonate resin is dissolved in methylene chloride (acidified with acetic acid), and titanium tetrachloride is added to give a red complex, which undergoes spectral analysis at 546 nm.

The aromatic homopolycarbonate or copolycarbonate should be one which has a logarithmic viscosity number of 0.2–3.0 dl/g, preferably 0.3–1.5 dl/g, which is measured in methylene chloride (1.0 g/dl in concentration) at 20° C. The divalent phenol compound includes, for example, 2,2-bis(4-hydroxyphenyl)propane, 2,2-bis(4-hydroxy-3,5-dimethylphenyl)propane, bis(4-hydroxyphenyl)methane, 1,1-bis(4-hydroxyphenyl)ethane, 2,2-bis(4-hydroxyphenyl) butane, 2,2-bis(4-hydroxy-3,5-diphenyl)butane, 2,2-bis(4-hydroxy-3,5-diethylphenyl)propane, 2,2-bis(4-hydroxy-3,5-diethylphenyl)propane, 1,1-bis(4-hydroxyphenyl) cyclohexane, and 1-phenyl-1,1-bis(4-hydroxyphenyl) ethane. Of these examples, the first one is preferable. They may be used alone or in combination with one another.

The polyphenylene ether resin in the present invention is a thermoplastic resin having the structural unit represented by the formula below. It should preferably have an intrinsic viscosity of 0.01–0.80 dl/g, measured in chloroform at 30° C.

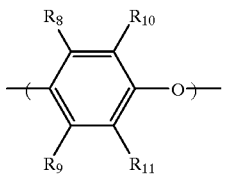

where $R_8$–$R_{11}$ may be identical or different, each denoting hydrogen, halogen, $C_{1-10}$ aliphatic group, aromatic group, alicyclic group, sulfonyl group, or nitro group.

Examples of $R_8$–$R_{11}$ include hydrogen and chlorine and those groups of methyl, ethyl, propyl, isopropyl, allyl, butyl, phenyl benzyl, methylbenzyl, chloromethyl, cyanomethyl, cyanomethoxy, ethoxy, phenoxy, and nitro.

Examples of the polyphenylene ether resin include poly (2,6-dimethyl-1,4-phenylene)ether, copolymer of 2,6-dimethylphenol and 2,4,6-trimethyl phenol, and copolymer of 2,6-dimethylphenol and 2,3,6-triethylphenol. In addition, the polyphenylene ether resin may have the graft structure or may be partly modified with a third component. The polyphenylene ether resin may be used regardless of the structure and amount of terminal groups. For example, it may be modified with an adequate amount of a compound (such as maleic anhydride and glycidyl methacrylate) having reactive groups so that it has improved compatibility with polystyrene or cyclic polyolefin resin. Such modification is permissible so long as it has a glass transition point the .rate of change of which satisfies the equation (1) above when it is incorporated with the liquid crystalline polymer.

The thermoplastic resin used as component (A) in the present invention may be used in combination with one or more of different kinds. Examples of combination are that of ABS and polycarbonate and that of polyphenylene ether and polystyrene or impact-resistant polystyrene. The thermoplastic resin may be partly replaced by a crystalline thermoplastic resin (less than 85 wt %, preferably 70 wt %, more preferably 50 wt %). Examples of such a crystalline thermoplastic resin include polyamide resin and polyester resin.

Typical examples are a combination of polycarbonate and polybutylene terephthalate, a combination of polycarbonate and polyethylene terephthalate, a combination of polyphenylene ether and nylon 6, and a combination of polyphenylene ether and nylon 66.

The liquid crystalline polymer used as component (B) in the present invention is a polymer which produces anisotropy when it is melted. It includes, for example, liquid crystalline polyester, liquid crystalline polyester amide, liquid crystalline polycarbonate, and liquid crystalline polyester elastomer. Preferable among these examples are those which have the ester linkage in the molecular chain, particularly liquid crystalline polyester and liquid crystalline polyester amide.

Some preferred examples of the liquid crystalline polymer. used as component (B) in the present invention include liquid crystalline polyesters in which the structural unit is an aromatic oxycarbonyl unit (p-hydroxybenzoic acid) or an ethylenedioxy unit. The crystalline polyesters are exemplified by those which have the structural units (I), (III), and (IV) shown below, preferably those which have the structural units (I), (II), (III), and (IV) shown below, and more preferably those which have the structural units (I), (II), (III), and (IV) shown below.

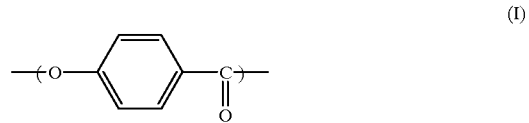 (I)

 (II)

 (III)

 (IV)

where $R_1$ is one or more groups selected from

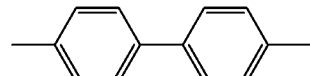

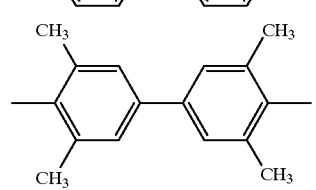

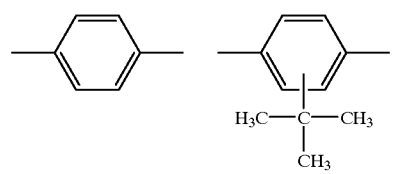

-continued

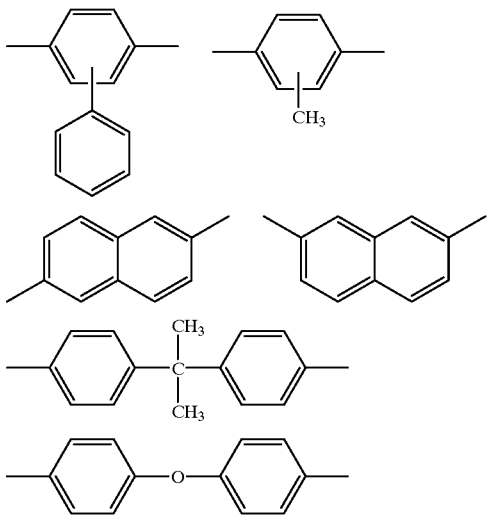

and R₂ is one or more groups selected from

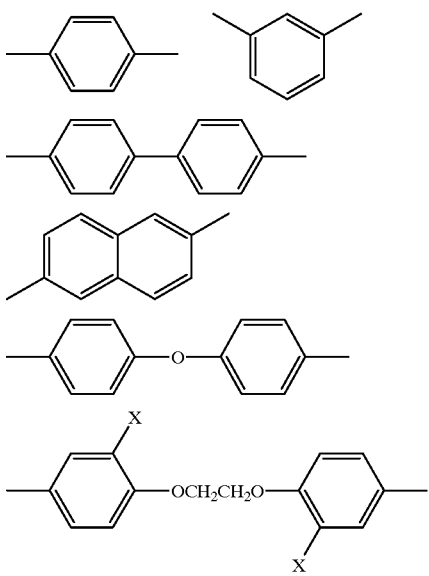

X denotes a hydrogen atom or chlorine atom.

Incidentally, it is desirable that the total amount of the structural units (II) and (III) should be substantially equal in mole to the amount of the structural unit (IV).

The structural unit (I) mentioned above is derived from p-hydroxybenzoic acid; the structural unit (II) is derived from one or more aromatic dihydroxy compounds selected from 4,4'-dihydroxybiphenyl, 3,3',5,5'-tetramethyl-4,4'-dihydroxybiphenyl, hydroquinone, t-butylhydroquinone, phenylhydroquinone, methylhydroquinone, 2,6-dihydroxynaphthalene, 2,7-dihydroxynaphthalene, 2,2-bis(4-hydroxyphenyl)propane, and 4,4'-dihydroxydiphenyl ether; the structural unit (III) is derived from ethylene glycol; and the structural unit (IV) is derived from one or more aromatic dicarboxylic acids selected from terephthalic acid, isophthalic acid, 4,4'-diphenyldicarboxylic acid, 2,6-naphthalenedicarboxylic acid, 1,2-bis(phenoxy)ethane-4,4'-dicarboxylic acid, 1,2'-bis (2-chlorophenoxy)ethane-4,4'-dicarboxylic acid, and 4,4'-diphenyldicarboxylic acid.

Preferable among these examples are those in which $R_1$ is

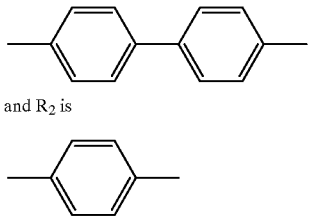

and $R_2$ is

The above-mentioned structural units (I), (II), (III), and (IV) may be copolymerized in any amount. However, they should preferably be copolymerized in specific amounts as follows so that the resulting resin composition exhibits the characteristic properties intended in the present invention.

In the case of copolymers composed of the structural units (I), (II), (III), and (IV), the total amount of the structural units (I) and (II) should be 30–95 mol %, preferably 40–93 mol %, of the total amount of the structural units (I), (II), and (III). The amount of the structural unit (III) should be 70–5 mol %, preferably 60–7 mol %, of the total amount of the structural units (I) (II), and (III). The molar ratio of the structural unit (I) to the structural unit (II) should be 75/25–95/5, preferably 78/22–93/7. In addition, the amount of the structural unit (IV) should be substantially equal in mole to the total amount of the structural units (II) and (III).

The term "substantially equal in mole" applies to the units constituting the polymer main chain excluding terminal groups.

One unit may not be equal in mole to another unit if their terminal groups are taken into account.

In the case where the structural unit (II) is not contained, the amount of the structural unit (I) should be 40–90 mol %, preferably 60–88 mol %, of the total amount of the structural units (I) and (III). The amount of the structural unit (IV) should be substantially equal in mole to the amount of the structural unit (III). This requirement is imposed from the standpoint of flowability.

The liquid crystalline polyesteramide should preferably be one which forms an anisotropic molten phase and contains, in addition to the structural units (I) to (IV), p-iminophenoxy units derived from p-aminophenol.

The preferred liquid crystalline polyester and liquid crystalline polyesteramide mentioned above may contain, in addition to the structural units (I) to (IV), the following components copolymerized therein in an amount not harmful to the properties of liquid crystal.

Aromatic dicarboxylic acids such as 3,3'-diphenyldicarboxylic acid and 2,2'-diphenyldicarboxylic acid.

Aliphatic dicarboxylic acids such as adipic acid, azelaic acid, sebacic acid, and dodecanedioic acid.

Alicyclic dicarboxylic acids such as hexahydroterephthalic acid.

Aromatic diols such as chlorohydroquinone, 3,4'-dihydroxybiphenyl, 4,4'-dihydroxydiphenylsulfone, 4,4'-dihydroxydiphenylsulfide, 4,4'-dihydroxybenzophenone, and 3,4'-dihydroxybiphenyl.

Aliphatic and alicyclic diols such as propylene glycol, 1,4-butanediol, 1,6-hexanediol, neopentylglycol, 1,4-cyclohexanediol, and 1,4-cyclohexanedimethanol.

Aromatic hydroxycarboxylic acids such as m-hydroxybenzoic acid and 2,6-hydroxynaphthoic acid.

p-aminobenzoic acid.

The liquid crystalline polymer used as component (E) in the present invention should have a melt viscosity of 0.5–200 Pa·s, preferably 1–100 Pa·s. It should have a melt viscosity lower than 50 Pa·s if the resin composition is to have good flowability.

Incidentally, the melt viscosity is measured using a flow tester (Koka-type) at the melting point (Tm)+10° C. and at a shear rate of 1000 sec$^{-1}$.

The melting point (Tm) is determined by differential thermal analysis. When a polymer, which has just completed polymerization, is heated from room temperature at a rate of 20° C./min, it gives a first endothermic peak temperature (Tm$_1$). When the polymer is kept at a temperature of (Tm$_1$,+20° C.) for 5 minutes, cooled to room temperature at a rate of 20° C./min, and heated again at a rate of 20° C./min, it gives a second endothermic peak temperature (Tm$_2$). The melting point (Tm) denotes (Tm$_2$).

The melting point of the liquid crystalline polymer is not specifically restricted. However, it should be lower than 340° C., preferably lower than 320° C., so that the effect of the present invention is fully produced or the liquid crystalline polymer is dispersed in the form of particles having the number-average particle diameter within the specified range.

The liquid crystalline polymer used in the present invention maybe produced in any manner which is not specifically restricted. It may be produced by any known polycondensation process for polyester.

Listed below are the preferred examples of the process for producing the liquid crystalline polymer.

(1) A process which consists of heating and melting a polyester (not containing p-hydroxybenzoic acid) and p-acetoxybenzoic acid under a dry nitrogen stream, thereby forming copolyester fragments through acidolysis, and then keeping the reactant under a reduced pressure until its viscosity increases.

(2) A process which involves polycondensation (with elimination of acetic acid) of p-acetoxybenzoic acid, a diacylated aromatic dihydroxy compound (such as 4,4'-diacetoxybiphenyl and diacetoxybenzene), and an aromatic dicarboxylic acid (such as 2,6-naphthalenedicarboxylic acid, terephthalic acid, and isophthalic acid).

(3) A process which consists of reacting acetic anhydride with p-hydroxybenzoic acid, an aromatic dihydroxy compound (such as 4,4'-dihycroxybiphenyl and hydroquinone), and an aromatic dicarboxylic acid (such as 2,6-naphthalenedicarboxylic acid, terephthalic acid, and isophthalic acid), thereby acylating the phenolic hydroxyl group, and then subjecting the reactants to polycondensation (with elimination of acetic acid).

(4) A process which involves polycondensation (with elimination of phenol) of a phenyl ester of p-hydroxybenzoic acid, an aromatic hydroxyl compound (such as 4,4'-dihydroxybiphenyl and hydroquinone), and a diphenyl ester of an aromatic dicarboxylic acid (such as 2,6-naphthalenedicarboxylic acid, terephthalic acid, and isophthalic acid).

(5) A process which consists of reacting p-hydroxybenzoic acid and an aromatic dicarboxylic acid (such as 2,6-naphthalenedicarboxylic acid, terephthalic acid, and isophthalic acid) with a prescribed amount of diphenyl carbonate, thereby forming respective diphenyl esters, and adding an aromatic hydroxyl compound (such as 4,4'-dihydroxybiphenyl and hydroquinone) and subjecting the reactants to polycondensation (with elimination of phenol).

(6) A process of (2) or (3) which is carried out in the presence of a polymer or oligomer (such as polyethylene terephthalate) or a bis(β-hydroxyethyl)ester of aromatic dicarboxylic acid (such as bis(β-hydroxyethyl) terephthalate).

The polycondensation for liquid crystalline polyester proceeds in the absence of catalysts; however, it may be catalyzed by a metal compound (such as stannous acetate, tetrabutyl titanate, potassium acetate, sodium acetate, and antimony trioxide), and metallic magnesium.

According to the present invention, 100 parts by weight of the thermoplastic resin as component (A) should be incorporated with the liquid crystalline polymer as component (B) in an amount of 0.5–100 parts by weight, preferably 3–60 parts by weight, more preferably 5–50 parts by weight, and most preferably 5–30 parts by weight.

With an excessively large or small amount, the liquid crystalline polymer as component (B) will not produce the effect of the present invention (improvement in flowability and metering stability at the time of molding, and impact strength and anisotropy of molded articles). An excessively large amount of liquid crystalline polymer in the resin composition causes the weldline to greatly decrease in strength.

The thermoplastic resin as component (A) changes in glass transition point when it is incorporated with the liquid crystalline polymer as component (B). For the present. invention to produce its effect, the rate of change in glass transition point (defined by the equation [1] below) should be smaller than 5%, preferably smaller than 3%, more preferably 0.05–3%, and most preferably 0.1–2%. This is an essential requirement to be met even when the resin composition is incorporated with a filler and other additives.

If the rate of change is greater than 5%, the resin composition does not produce the desired effect due to the liquid crystalline polymer. Only when the rate of change is within the range specified above, the liquid crystalline polymer takes on a specific morphology, thereby producing the effect of the present invention, i.e., balanced flowability, impact resistance, and chemical resistance.

The glass transition point may be measured by using a differential scanning calorimeter (DSC). The glass transition point (Tg) is an inflection point that is observed when a sample is heated from room temperature at a rate of 20° C./min. A resin composition composed of several components may give several inflection points attributable to respective components. One of them should be chosen to assign the glass transition point due to the thermoplastic resin as component (A). The rate of change in the glass transition point should be evaluated in terms of absolute values.

The rate of change in the glass. transition point may be calculated from the equation [1] below, in which Tg$_A$ is the. glass transition point of the thermoplastic resin as component (A), and Tg$_T$ is the glass transition point attributable to the thermoplastic resin as component (A) in the resin composition.

In the case where the resin composition contains optional fillers and additives, the glass transition point measured after compounding is regarded as Tg$_T$ attributable to the thermoplastic resin as component (A). In the case where more than one kind of thermoplastic resin as component (A) is used as the matrix resin, the glass transition point of each thermoplastic resin as component (A) is measured and then the glass transition point attributable to each thermoplastic resin as component (A) is measured. The sum of measurements is regarded as the overall rate of change in glass transition point.

$$\text{Rate of change } (\%) = |(Tg_A - Tg_T)/Tg_A| \times 100 \quad (1)$$

When incorporated into the thermoplastic resin as component (A), the liquid crystalline polymer as component (B) is dispersed therein in the form of fine particles. The number-average particle diameter is not specifically restricted. However, it should be in the range of 0.5–5 µm, preferably 0.7–4.0 µm, more preferably 1.0–2.5 µm, and most preferably 1.0–2.0 µm, so that the present invention exhibits its good effect (flowability and impact resistance).

When the liquid crystalline polymer as component (B) has the number-average particle diameter in the above-specified range, the present invention exhibits its good effect (flowability and impact resistance which are well balanced).

The liquid crystalline polymer as component (B) may be dispersed in any form which is not specifically restricted. For the resin composition to exhibit its good characteristic properties (such as impact resistance), it is desirable that the particles of the liquid crystalline polymer should be sphere or ellipsoid having an aspect ratio (the ratio of the major axis to the minor axis) smaller than 3, preferably in the range of 1.05–2.7, and more preferably in the range of 1.1–2.5.

When incorporated into the thermoplastic resin as component (A), the liquid crystalline polymer as component (B) forms particles therein characterized by the number-average particle diameter and the aspect ratio, which can be measured in any manner without specific restrictions. An example o the measuring methods is observation of a section under a transmission electron microscope (TEM). This section is prepared by cutting a molded piece at the center of its core layer in the direction of flow. The number-average particle diameter and aspect ratio are obtained in terms of the mean value for 50 particles in the electron micrograph. The particle diameter is expressed in terms of the major axis. Each particle is measured for the major axis and minor axis and its aspect ratio is calculated, and the thus obtained aspect ratios are averaged afterward.

The resin composition of the present invention may be incorporated with a filler to impart mechanical strength and other characteristic properties. The filler is not specifically restricted. It may be fibrous, platy, powdery, granular, or non-fibrous. Typical examples include glass fiber, carbon fiber (derived from PAN or pitch), metal fiber (such as stainless steel fiber, aluminum fiber, and brass fiber), organic fiber (such as aromatic polyamide fiber), fibrous or whisker filler (such as gypsum fiber, ceramic fiber, asbestos fiber, zirconia fiber, alumina fiber, silica fiber, titanium oxide fiber, silicon carbide fiber, rock wool, potassium titanate whisker, barium titanate whisker, aluminum borate whisker, and silicon nitride whisker), and powdery, granular, or platy filler (such as mica, talc, kaolin, silica, calcium carbonate, glass beads, glass flake, glass microballoon, clay, molybdenum disulfide, wollastonite, titanium oxide, zinc oxide, potassiumpolyphosphate, and graphite. Of these fillers, glass fiber and carbon fiber are desirable. Carbon fiber is more desirable in the case where the resin composition needs an ability to shield electromagnetic waves or needs a high elastic modulus. The glass fiber is not specifically restricted in its kind so long as it is designed for resin reinforcement. It may be selected from long fiber, short fiber (chopped strand), or milled fiber. It may be coated or sized with a thermoplastic resin (such as ethylene-vinyl acetate copolymer) or a thermosetting resin (such as epoxy resin).

The carbon fiber may be one which is derived from PAN or pitch. It should preferably be of high-strength type and high-elongation type so that it will not break during molding. Carbon fiber with low strength breaks during compounding and molding, and the resulting short carbon fibers do not provide sufficient conductivity necessary for shielding electromagnetic waves. Carbon fiber with an excessively high tensile modulus (more than 300 GPa) in the longitudinal direction of fiber is liable to break because of low elongation at break, except for a special grade with an extremely high strength. Preferred carbon fiber is one which meets part or all of the following requirements: a tensile strength higher than 3500 MPa, a tensile modulus lower than 300 GPa, and an elongation at break greater than 1.4%. The fibrous filler, when incorporated into the fiber-reinforced resin composition, should have a weight-average fiber length greater than 0.2 mm, preferably greater than 0.25 mm, and more preferably greater than 0.3 mm, from the standpoint of ability to shield electromagnetic waves.

The fibrous filler in the resin composition may be measured for its weight-average fiber length in the following way. A sample of the resin composition (about 5 g) is heated for ashing in a crucible at 550° C. for 7 hours. Of the remaining filler, a quantity of 100 mg is taken and dispersed into a 100 cc of soapy water. A few drops of the dispersion are placed on a slide glass, and the slide is observed (for photographing) under a microscope. The micrograph is examined for fiber length. An average value is obtained from more than 500 measurements. Ashing should be carried out carefully so as to avoid oxidation and combustion. Ashing in a nitrogen atmosphere is desirable. If the thermoplastic resin is soluble, the resin composition may be dissolved in a solvent to separate the fibrous filler for measurement.

In the present invention, the ability to shield electromagnetic waves is measured as follows. A sample of the fiber-reinforced thermoplastic resin composition is molded into a flat plate measuring 150 mm square and 1 mm thick. The attenuation of electromagnetic waves (in the frequency band of 10–1000 MHz) passing through this flat plate is measured. This measurement is carried out by the so-called advantest method, which employs TR17301A (made by Advantest Co., Ltd.) to evaluate the shielding material and a probe antenna. If the resin composition is to be used for the housing of electric and electronic machines, it should be able to attenuate electromagnetic waves (300 MHz) more than 30 dB, preferably more than 40 dB, so that the housing protects electric circuits from electromagnetic noise.

The above-mentioned fillers may be used in combination with one another. The filler to be used in the present invention may be surface-treated with any known surface treating agent and coupling agent (such as silane coupling agent and titanate coupling agent).

The amount of the filler for 100 parts by weight of the resin composition (the total amount of components (A) and (B)) should be 0.5–300 parts by weight, preferably 10–200 parts by weight, and more preferably 10–50 parts by weight.

The thermoplastic resin composition of the present invention may be incorporated with a phosphorus compound to impart flame retardance and other characteristic properties. The phosphorus compound is not specifically restricted so long as it is an organic or inorganic compound containing phosphorus. It includes, for example, red phosphorus, ammonium polyphosphate, polyphosphazene, phosphate, phosphonate, phosphinate, and phosphineoxide. Of these examples, red phosphate and aromatic phosphate are preferable. Red phosphate not only imparts flame retardance but also improves long-term heat resistance. Aromatic phosphate not only imparts flame retardance but also slightly improves flowability.

Red phosphorus as such is unstable. It gradually dissolves in water and gradually reacts with water. These undesirable behaviors can be avoided by adequate methods explained below.

1) Making red phosphorus into fine particles without crushing in such a way that resulting fine particles have no active surfaces highly reactive with water and oxygen. (Japanese Patent Laid-open No. 229806/1993)
2) Incorporating red phosphorus with trace amounts of aluminum hydroxide or magnesium hydroxide, thereby catalytically protecting red phosphorus from oxidation,.
3) Coating red phosphorus with paraffin or wax, thereby isolating red phosphorus from water.
4) Mixing red phosphorus with ε-caprolactam or trioxane for stabilization.
5) Coating red phosphorus with a thermosetting resin (such as phenolic resin, melamine resin, epoxy resin, and unsaturated polyester resin) for stabilization.
6) Treating red phosphorus with an aqueous solution of a salt of metal (such as copper, nickel, silver, iron, aluminum, and titanium), thereby causing a metal-phosphorus compound to separate out on the surface of red phosphate for stabilization.
7) Coating red phosphorus with aluminum hydroxide, magnesium hydroxide, titanium hydroxide, or zinc hydroxide for stabilization.
8) Coating red phosphorus with iron, cobalt, nickel, manganese, or tin by electroless plating for stabilization.

The first, fifth, and seventh methods are preferable, and the first and fifth methods are more preferable. Of the thermosetting resins used in the fifth method, phenolic resin and epoxy resin are desirable, and phenolic resin is particularly desirable.

Red phosphorus prior to incorporation into the resin composition should have an average particle diameter of 35–0.01 μm, preferably 30–0.1 μm, from the standpoint of flame retardance, mechanical properties, and wet heat resistance and from the standpoint of chemical and physical degradation caused by crushing for recycling.

The average particle diameter of red phosphorus may be measured using a particle size distribution measuring apparatus of laser diffraction type. This apparatus may be operated wet or dry. For wet operation, red phosphorus may be dispersed in water. Prior to dispersion, red phosphorus may be surface-treated with alcohol or neutral detergent. A dispersing agent, such as sodium hexametaphosphate and sodium pyrophosphate, may be used. Dispersion may be accomplished in an ultrasonic bath.

The red phosphorus used in the present invention should not contain coarse particles larger than 75 μm, which have an adverse effect on flame retardance, mechanical characteristics, wet heat resistance, and recycling performance. Such coarse particles should be removed by classification. The amount of coarse particles (larger than 75 μm) should be less than 10 wt %, preferably less than 8 wt %, and more preferably less than 5 wt %. It should be as close to zero as possible although no lower limit exists.

The amount of coarse particles (larger than 75 μm) in red phosphorus can be determined by classification through a 75-μm mesh. In other words, it can be calculated from (Z/100)×100 (%), where Z (g) is the amount that remains when 100 g of red phosphorus is classified through a 75-μm mesh.

The red phosphorus used in the present invention should have the property that upon extraction in hot water, it gives water a conductivity of 0.1–1000 μS, preferably 0.1–800 μS, and more preferably 0.1–500 μS. This requirement is necessary for the resulting molded article to have good moisture resistance, mechanical strength, tracking resistance, and recycling performance. (To measure the conductivity, 5 g of red phosphorus is extracted with 100 mL of pure water in an autoclave at 121° C. for 100 hours, and the extract water is filtered and diluted to 250 mL.)

The red phosphorus used in the present invention will give off phosphine (hydrogen phosphide), but its amount should be less than 100 ppm, preferably less than 50 ppm, and more preferably less than 20 ppm. This requirement is set so that the resulting resin composition remains stable during extrusion and molding with a minimum of gas evolution, retains high mechanical strength even after hang-up, and provides molded articles which have a good external appearance and protect terminals from corrosion. The amount of phosphine evolved is determined in the following manner. A sample of red phosphorus (5 g) is placed in a vessel (500 mL), with the atmosphere therein replaced with nitrogen. The pressure in the vessel is reduced to 10 mmHg and the sample is heated at 280° C. for 10 minutes. After cooling to 25° C., nitrogen is admitted into the vessel until the pressure therein reaches 760 mmHg. The atmosphere in the vessel is tested using a phosphine detecting tube. The amount (in ppm) of phosphine is calculated from the indicated value (in ppm) of the detecting tube multiplied by the ratio of dilution.

Preferred commercial red phosphate is "Novaexcel 140" or "Novaexcel F5" from Rin-Kagaku Kogyo Co., Ltd.

The aromatic phosphate used in the present invention is a phosphorus compound which is represented by the formula below.

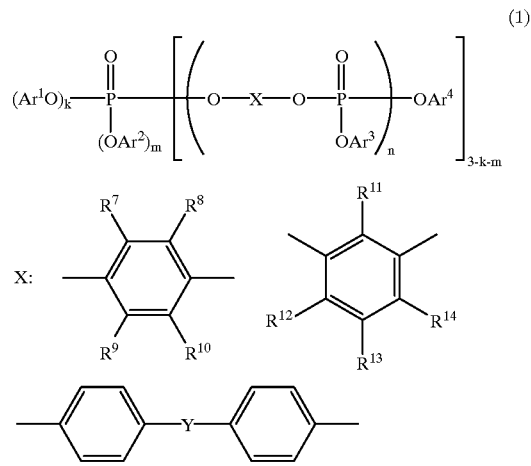

(1)

where n is 0 or an integer, k and m each is 0, 1 or 2 such that k+m is 0, 1, or 2, preferably k and m each is 0 or 1, more preferably k and m each is 1.

$R^7$–$R^{14}$ are identical or different groups, each denoting a hydrogen atom or a $C_{1-5}$ alkyl group. Examples of the $C_{1-5}$ alkyl group include methyl group, ethyl group, n-propyl group, isopropyl group, n-butyl group, sec-butyl group, tert-butyl group, n-isopropyl group,. neopentyl group, tert-pentyl group, 2-isopropyl group, 3-isopropyl group, and neoisopropyl group. Of these groups, hydrogen, methyl group, and ethyl group are preferable, and hydrogen is particularly preferable.

$Ar^1$–$Ar^4$ are identical or different groups, each denoting a phenyl group or a phenyl group replaced with an organic residue not containing halogen. Examples of these groups include phenyl group, tolyl group, xylyl group, cumenyl group, mesityl group, naphthyl group, indenyl group, and anthryl group. Of these groups, phenyl group, tolyl group, xylyl group, cumenyl group, and naphthyl group are preferable, and phenyl group, tolyl group, and xylyl group are particularly preferable.

Y denotes a direct bond, O, S, $SO_2$, $C(CH_3)_2$, $CH_2$, and CHPh, where Ph denotes a phenyl group.

Preferred examples of commercial aromatic phosphate include "PX-200", "PX-201", "CR-733S", CR-741", and "TPP" available from Daihachi Kagaku Co., Ltd.

The amount of the phosphorus compound to be added for 100 part by weight of the resin composition composed of thermoplastic resin as component (A) and liquid crystalline polymer as component (B) should be 0.01–30 parts by weight, preferably 0.05–20 parts by weight, more preferably 0.06–15 parts by weight, and most preferably 0.08–10 parts by weight. With an insufficient amount, the phosphorus compound does not produce the effect of flame retardance; with an excess amount, the phosphorus compound has an adverse effect on the characteristic properties of the resin composition and rather functions as a combustion promoting agent.

In the case where the thermoplastic resin composition of the present invention is incorporated with red phosphorus, it is recommended that a metal oxide be added as a stabilizer of red phosphate, so that the resin composition remains stable and retains strength during extrusion and molding and yields molded articles having no corrosive action on terminals. Examples of the metal oxide include cadmium oxide, zinc oxide, cuprous oxide, cupric oxide, ferrous oxide, ferric oxide, cobalt oxide, manganese oxide, molybdenum oxide, tin oxide, and titanium oxide. Of these examples, cadmium oxide, cuprous oxide, cupric oxide, and titanium oxide (which are oxides of metals other than Group I metals and/or Group II metals) are preferable, and cuprous oxide, cupric oxide, and titanium oxide are particularly preferable. Oxides of Group I metals and/or Group II metals are also acceptable. Titanium oxide is most desirable because the resulting resin composition remains stable and retains strength during extrusion and molding and yields molded articles having no corrosive action on terminals and also because it does not color the resin composition.

The amount of the metal oxide to be added for 100 parts by weight of the resin composition composed of the thermoplastic resin as component (A) and the liquid crystalline polymer as component (B) should be 0.01–20 parts by weight, preferably 0.1–10 parts by weight, so that the resin composition has good mechanical properties and moldability.

The thermoplastic resin composition of the present invention may be incorporated with ordinary additives (exemplified below) to impart desired characteristic properties.

Antioxidant and heat stabilizer, such as hindered phenol, hydroquinone, phosphite, and substituted products thereof.

UV light absorber, such as resorcinol, salicylate, benzotriazole, and benzophenone.

Anti-coloring agent, such as phosphite and hypophosphite.

Slip agent and mold release, such as montanic acid and its salt, ester, and half ester, stearyl alcohol, stearamide, and polyethylene wax.

Dye, such as nigrosine, and pigment, such as cadmium sulfide and phthalocyanine.

Electrically conducting agent, such as carbon black (which also functions as a coloring agent).

Nucleating agent.

Plasticizer.

Flame retardant, such as red phosphorus and aromatic phosphate.

Other flame retardant, such as polystyrene bromide, brominated polyphenylene ether, brominated polycarbonate, magnesium hydroxide, melamine, and cyanuric acid and salt thereof.

Flame retardant auxiliary.

Slide property improver, such as graphite and fluoroplastic.

Antistatic agent.

For further improvement in characteristic properties, one or more selected from the following may be added. Acid-modified olefin polymer (modified with maleic anhydride), olefin copolymer (such as ethylene-propylene copolymer, ethylene-1-butene copolymer, ethylene-propylene-nonconjugated diene copolymer, ethylene-ethyl acrylate copolymer, ethylene-glycidyl methacrylate copolymer, ethylene-vinyl acetate-glycidyl methacrylate copolymer, and ethylene-propylene-g-maleic anhydride copolymer), and elastomer (such as polyester polyether elastomer and polyester polyester elastomer).

The thermoplastic resin composition of the present invention may be produced by melt mixing at 180–350° C. in a single-screw extruder, twin-screw extruder, or triple-screw extruder of "unimelt" type or in a mixing machine of kneader type. The processing conditions should be adequately controlled so that the present invention fully produces its effect.

For example, the melt-mixing temperature should be lower than the melting point of the liquid crystalline polymer as component (B) and higher than the temperature at which the liquid crystalline polymer begins to flow under stress, so that the rate of change in glass transition point is within the range specified in the present invention (which is the feature of the present invention). The preferred melt-mixing temperature ranges from the melting point of the liquid crystalline polymer minus 5° C. to the temperature at which the liquid crystalline polymer begins to crystallize. The more preferred melt-mixing temperature ranges from the melting point of the liquid crystalline polymer minus 10° C. to the temperature at which the liquid crystalline polymer begins to crystallize. The resin composition obtained by melt-mixing may be used directly for molding; however, it is also possible to use it in pellet form.

The resin composition of the present invention should be molded by melting at a temperature which is lower than the melting point of the liquid crystalline polymer as component (B) and higher than the temperature at which the liquid crystalline polymer begins to flow under stress, so that the rate of change in glass transition point is within the range specified in the present invention (which is the feature of the present invention). The preferred molding temperature ranges from the melting point of the liquid crystalline polymer minus 5° C. to the temperature at which the liquid crystalline polymer begins to crystallize. The more preferred molding temperature ranges from the melting point of the liquid crystalline polymer minus 10° C. to the temperature at which the liquid crystalline polymer begins to crystallize.

It is desirable that melt-mixing is carried out at the melt-mixing temperature specified above and also molding is carried out at the molding temperature specified above.

The melt-mixing temperature and molding temperature denote the stock temperature. In the case of melt processing such as melt mixing and melt molding, the stock temperature is usually higher than the set temperature on account of heat generation due to shear; therefore, it is necessary to set the cylinder temperature slightly lower than the intended stock temperature or it is necessary to control the screw revolution so that the desired stock temperature is attained. In the case of an extruder with a side feeder, this object is achieved by feeding part or all of the liquid crystalline polymer as component (B) through the side feeder. The temperature at which the liquid crystalline polymer begins to crystallize may be determined by observing a sample which is heated at a rate of 5.0° C./min by shearing at a shear rate of 1000 sec$^{-1}$ in a shear stress heating apparatus (CSS-450). When flow begins in the entire field of view observed through an object lens (×60), the temperature is recorded.

The thermoplastic rein composition of the present invention may be prepared by thorough mixing in an extruder or the like from the thermoplastic resin as component (A), the liquid crystalline polymer as component (B), and optional additives and fillers, with or without preliminary mixing. Mixing in two stages is desirable from the standpoint of handling and productivity. In the first stage, an intermediate mixture is prepared in which the content of component (B) is higher than that intended in the final resin composition. In the second stage, the intermediate mixture is mixed with the rests of components and optional additives and fillers.

The addition of the optional additives may be accomplished in two stages. In the first stage, an intermediate mixture (containing optional additives) is prepared in which the content of component (B) is higher than that intended in the final resin composition. In the second stage, the intermediate mixture is mixed with the rests of components and other additives and fillers than those which have been added before.

The intermediate mixture with a high content of the liquid crystalline polymer may be used in the form of so-called master pellets. However, it may also be in the form of chips or powder or a mixture thereof. Components (A) and (B) to be mixed with the intermediate mixture should be in the form of pellets. However, they may also be in the form of chips or powder or a mixture thereof. Components (A) and (B) should preferably be in approximately the same form and size so that they are mixed uniformly.

The resin composition of the present invention may be made into molded articles (such as three-dimensional moldings, sheet, container, and pipe) by any known molding methods, such as injection molding, extrusion molding, blow molding, press molding, and injection press molding. Particularly, it can be made into thin-wall molded articles (such as sheet and box) by virtue of its good flowability. The thin wall may be thinner than 1.2 mm. To be more specific, such thin-wall molded articles have thin-wall parts (thinner than 1.2 mm) whose ratio in the entire surface area is larger than 10%, preferably larger than 15%, or thin-wall parts (thinner than 1.0 mm) whose ratio in the entire surface area is larger than 10%.

The resin composition of the present invention is suitable for injection molding and injection press molding, particularly for injection molding. Its molded articles include machine parts, electric and electronic parts, and automotive parts. In the case of injection molding, injection speed and injection pressure should be properly controlled so that mold filling takes an adequate length of time. This is effective for the molded articles to exhibit good impact strength and chemical resistance.

The thermoplastic resin composition of the present invention, which is prepared as mentioned above, exhibits good flowability at the time of molding. Owing to its good flowability, it can be molded without short shot under greatly varied molding conditions. In addition, owing to its good metering stability, it gives molded articles with uniform characteristic properties. In the case where the thermoplastic resin as component (A) is a polycarbonate resin, the resin composition yields a molded article with a thick part thicker than ¼ inch which is superior in impact strength to a molded product obtained from the polycarbonate alone. Owing to its good heat resistance, the resin composition of the present invention is suitable for housing, cover, casing, etc. which need heat resistance in the field of electric and electronic machines. Owing to its good chemical resistance, the resin composition gives highly reliable molded articles which are exposed to chemical solutions and need surface treatment with a chemical solution. This chemical resistance is particularly effective against oils, plasticizers, detergents, and electrolytes. Owing to its low anisotropy, the resin composition gives molded articles which are small in dimensional change due to molding shrinkage and thermal expansion and are also highly reliable regardless of shape (bulky or thin plate).

The molded articles thus obtained include the following.

Electric and electronic parts, such as gears, cases, sensors, LED lamps, connectors, sockets, paper grippers, resistors, relay cases, switches, coil bobbins, capacitors, variable capacitor cases, optical pickups, optical pickup slide bases, oscillators, terminal boards, transformers, plugs, printed wiring boards, tuners, speakers, microphones, headphones, small motors, magnet head bases, power modules, housings, semiconductors, liquid crystal display parts, FDD carriages, FDD chassises, HDD parts, motor brush holders, parabolic antennas, and computer-related parts.

Domestic and office appliance parts, such as VTR parts, television parts, irons, hair dryers, rice cookers, electronic ovens, audio parts, parts of audio machines (such as audio- laser disc and compact disc), luminaire parts, refrigerator parts, washing machine parts, air conditioner parts, typewriter parts, and word processor parts.

Office computer parts, telephone parts, facsimile parts, and duplicator parts.

Washing jigs and bearings (such as oilless bearings, stern bearings, and underwater bearing).

Machine parts (such as motor parts, lighter parts, and typewriter parts).

Optical equipment and precision machines (such as microscopes, binoculars, cameras, and watches).

Alternator terminals, alternator connectors, and IC regulators.

Valves (such as exhaust gas valves) and pipes (such as fuel intake valves).

Automotive and vehicle parts, such as air intake nozzle snorkels, intake manifolds, fuel pumps, engine cooling water joints, carburetor main bodies, carburetor spacers, exhaus gas sensors, cooling water sensors, oil temperature sensors, throttle position sensors, crankshaft position sensors, air flow meters, brake pad wear sensors, air conditioner thermostat bases, heater hot air control valves, radiator motor brush holders, water pump impellers, turbine vanes, wiper motor parts, distributors, starter switches, starter relays, transmission wire harness, window washer nozzle, window washer liquid tanks, brake oil reservoirs, battery casings, air conditioner panel switch bases, fuel electromagnetic valve coils, fuse connectors, horn terminals, insulating boards for electric parts, step motor rotors, lamp sockets, lamp reflectors, lamp housings, brake pistons, solenoid bobbins, engine oil filters, igniter cases, power sheet housings, and ignition coil parts.

Shampoo bottles, rinse bottles, chemical tanks, and oil transfer containers, oil pans, toiletery goods, entertainment goods, medical supplies, and medical machines and equipment.

The molded articles produce a remarkable effect when used in the form of casings, switches, bobbins, connectors, sockets, portable telephone housings, and personal computer housings, in which thin parts (thinner than 1.2 mm) account for more than 10% of the entire surface area.

EXAMPLES

The invention will be described in more detail with reference to the following examples, which are not intended to restrict the scope thereof.

Referential Example 1

Four kinds of thermoplastic resins were prepared as follows.

PC:

Polycarbonate resin "Lexan 141" from General Electric Co., Ltd. It contains phenolic terminal groups ($E_P$) and non-phenolic terminal groups ($E_N$) such that the equivalent ratio ($E_P$)/($E_N$) is 1/100 (determined by photometry of titanium tetrachloride complex). It has a glass transition point of 153° C. measured by DSC. This polycarbonate resin is designated as PC(a). For comparison, a polycarbonate resin was prepared by melt polymerization from bisphenol A and diphenyl carbonate. It has a logarithmic viscosity of 0.45 dl/g (measured in methylene chloride (1.0 g/dl) at 20° C.), an ($E_P$)/($E_N$) ratio of 1/3, and a glass transition point of 146° C. This polycarbonate resin is designated as PC(b).

PC//ABS:

A resin mixture was prepared from 55 wt % of "Lexan 141" (a polycarbonate resin mentioned above) and 45 wt % of ABS containing 9% butadiene rubber, by mixing in a twin-screw extruder at a cylinder temperature of 250° C. and a screw speed of 100 rpm. This resin mixture has glass transition points at −72° C., 105° C., and 152° C., measured by DSC. The first glass transition point (−72° C.) is attributable to the rubber component in the ABS, the second glass transition point (105° C.) is attributable to the AS component in the ABS, and the third glass transition point (152° C.) is attributable to the polycarbonate resin. The rate of change in each glass transition point was calculated, and their sum was examined.

PPE:

Poly-2,6-dimethyl-1,4-phenylene ether was prepared from 2,6-xylenol by oxidative coupling with the aid of amine-copper complex. It has a glass transition point of 210° C. measured by DSC.

PPE//PS:

This is "Noryl 731" from Nippon GE Plastics Co., Ltd. It has a glass transition point of 153° C. This single glass transition point was regarded as the glass transition point of the matrix resin.

Referential Example 2

Four kinds of liquid crystalline polymers were prepared as follows.

LCP1:

A reaction vessel equipped with a stirrer and a distilling tube was charged with 994 parts by weight p-hydroxybenzoic acid, 126-parts by weight of 4,4'-dihydroxybiphenyl, 112 parts by weight of terephthalic acid, 216 parts by weight of polyethylene terephthalate (having an intrinsic viscosity of about 0.6 dl/g), and 960 parts by weight of acetic anhydride. Upon polymerization, there was obtained a liquid crystalline polymer composed of 80 mol equivalent of aromatic oxycarbonyl units, 7.5 mol equivalent of aromatic dioxy units, 12.5 mol equivalent of ethylene dioxy units, and 20 mol equivalent of aromatic dicarboxylic acid units. It has a melting point of 314° C., a crystallization starting temperature of 293° C., and a melt viscosity of 21 Pa·s at 324° C. (at a shear rate of 1000 sec$^{-1}$ through an orifice 0.5 mm in diameter and 10 mm long).

LCP2:

A reaction vessel equipped with a stirrer and a distilling tube was charged with 907 parts by weight p-hydroxybenzoic acid, 457 parts by weight of 6-hydroxy-2-naphthoic acid, and 873 parts by weight of acetic anhydride. Upon polymerization, there was obtained a liquid crystalline polymer composed of 100 mol equivalent of aromatic oxycarbonyl units. It has a melting point of 283° C., a crystallization starting temperature of 233° C., and a melt viscosity of 50 Pa·s at 293° C. (at a shear rate of 1000 sec$^{-1}$ through an orifice 0.5 mm in diameter and 10 mm long).

LCP3:

A reaction vessel equipped with a stirrer and a distilling tube was charged with 994 parts by weight p-hydroxybenzoic acid, 346 parts by weight of polyethylene terephthalate (having an intrinsic viscosity of about 0.6 dl/g), and 809 parts by weight of acetic anhydride. Upon polymerization, there was obtained a liquid crystalline polymer composed of 80 mol equivalent of aromatic oxycarbonyl units, 20 mol equivalent of ethylene dioxy units, and 20 mol equivalent of aromatic dicarboxylic acid units. It has a melting point of 282° C., a crystallization starting temperature of 2310C, and a melt viscosity of 24 Pa·s at 292° C. (at a shear rate of 1000 sec$^{-1}$ through an orifice 0.5 mm in diameter and 10 mm long).

LCP4:

A reaction vessel equipped with a stirrer and a distilling tube was charged with 901 parts by weight p-hydroxybenzoic acid, 126 parts by weight of 4,4'-dihydroxybiphenyl, 112 parts by weight of terephthalic acid, 346 parts by weight of polyethylene terephthalate (having an intrinsic viscosity of about 0.6 dl/g), and 960 parts by weight of acetic anhydride. Upon polymerization, there was obtained a liquid crystalline polymer composed of 72.5 mol equivalent of aromatic oxycarbonyl units, 7.5 mol equivalent of aromatic dioxy units, 20 mol equivalent of ethylene dioxy units, and 27.5 mol equivalent of aromatic dicarboxylic acid units. It has a melting point of 267° C., a crystallization starting temperature of 238° C., and a melt viscosity of 34 Pa·s at 277° C. (at a shear rate of 1000 sec$^{-1}$ through an orifice 0.5 mm in diameter and 10 mm long).

Examples 1 to 27 and Comparative Examples 1 to 23

In each example, a mixture was obtained by melt mixing from the thermoplastic resin and liquid crystalline polymer shown in Table 1. Melt mixing was accomplished using a twin-screw extruder equipped with a side feeder, Model TEX30, made by The Japan Steel Works, Ltd. The thermoplastic resin was fed into the extruder through the hopper. The liquid crystalline polymer (LCP1 to LCP4 obtained in Referential Example 2) was fed (together with optional filler shown in Table 2) through the side feeder. During melt mixing, the temperature of the cylinder heater was set and the stock temperature was controlled as shown in Table 1. (The stock temperature is higher than the set temperature of the cylinder heater because of heat generation by shear in the cylinder.) The resulting mixture was made into pellets, which were subsequently air dried. The pellets were injection-molded under the following conditions using Sumitomo Nestal Injection Molding Machine "Promat 40/25", made by Sumitomo Heavy Industries, Ltd.

Stock temperature: as shown in Table 1.

Mold temperature: 80° C.

Injection speed: 99%

Injection pressure: minimum filling pressure plus 5 kgf/cm$^2$

Thus, there were obtained test pieces for measurement of the following items (2) and (4) to (9).

Methods for evaluation and measurement are as follows.

(1) Rate of Change in Glass Transition Point:

The thermoplastic resin as component (A) was measured for the glass transition point ($Tg_A$) using a differential scanning. calorimeter (DSC-7 made by Perkin-Elmer Corp.) The resin composition composed of the thermoplastic resin as component (A) and the liquid crystalline polymer as component (B) was also measured for the glass transition point ($Tg_T$) attributable to the thermoplastic resin as component (A). A sample (10 mg) cut out of the pellet was heated from room temperature at a rate of 20° C./min, and the inflection point observed was regarded as the glass transition point (Tg). The rate of change in the glass transition point was calculated from the following equation (1).

Rate of change (%)=|($Tg_A$−$Tg_T$)/$Tg_A$|×100    (1)

where $Tg_A$ is the glass transition point of the thermoplastic resin as component (A), and $Tg_T$ is the glass transition point attributable to the thermoplastic resin as component (A) in the resin composition.

(2) Particles of Liquid Crystalline Polymer—Number-average Particle Diameter and Aspect Ratio A specimen (⅛ inch bar) for measurement of Izod impact strength was prepared according to ASTM D256. A section was cut out of the central part of the specimen in the flow direction. The section was observed under a transmission electron microscope (TEM), Model H-7100, made by Hitachi Ltd. The number-average particle diameter and aspect ratio were obtained in terms of the mean value for 50 particles in the electron micrograph. The particle diameter is expressed in terms of the major axis. Each particle is measured for the major axis and minor axis and its aspect ratio is calculated, and the thus obtained aspect ratios are averaged afterward.

(3) Flowability

Each resin composition was injection-molded to give a straight test piece (12.7 mm wide and 0.8 mm thick) using the above-mentioned molding machine under the following conditions. The flowability is expressed in terms of the length of the specimen obtained.

Stock temperature: 300° C. for those resin compositions containing PC, PPE, or PPE//PS, and 250° C. for the resin composition containing PC//ABS.

Injection speed: 99%

Injection pressure: 500 kgf/cm$^2$ (4) Heat Resistance

Each resin composition was injection-molded to give a rod-like test piece (127 mm long, 12.7 mm wide, 1.2 mm thick) using the above-mentioned molding machine. The test piece was subjected to sag test in a hot air oven for 30 minutes. The test piece was clamped by its upper end (27 mm), so that the remaining part (100 mm long) was exposed to heat. The test temperature was 170° C. for those resin compositions containing PC, PPE, or PPE//PS, and 120° C. for the resin composition containing PC//ABS. The result is indicated by ○ (with deformation smaller than 5 mm) or × (with deformation larger than 5 mm).

(5) Impact Strength

Impact strength was measured using a notched Izod test piece (¼ inch) according to ASTM D256.

(6) Chemical Resistance

A test piece for flexure (127 mm long, 12.7 mm wide, and 3.2 mm thick) was prepared using the above-mentioned molding machine. With its ends held by jigs, the test piece was bent such that the chord was 110 mm long. The central part of the chord was coated with DOP (dioctyl phthalate, from Daihachi Kagaku Co., Ltd.). Time required for the test piece to break was measured.

(7) Metering Stability (fluctuation in the amount of cushion)

Injection molding for flexural test pieces (127 mm long, 12.7 mm wide, 3.2 mm thick) was repeated 50 cycles, each cycle consisting of 5 seconds for injection, 10 seconds for cooling, and 4 seconds for intermission. Fluctuation (in terms of standard deviation) in the amount of cushion was recorded. (The amount of cushion is an excess amount of resin injected which is necessary to avoid sink during molding. It is expressed in terms of the distance (in mm) from the position of the forward end of the cylinder to the position of the screw corresponding to the amount to fill the mold plus an excess amount.)

(8) Effect of Reducing Anisotropy

A square flat test piece (70 mm square, 1 mm thick) was prepared using the above-mentioned molding machine. The test piece was cut into strips (70 mm long, 12.7 mm wide, 1 mm thick) in the direction parallel to and perpendicular to the resin flow. The number of the strips was 20 for each direction. The strip specimen underwent flexural test according to ASTM D790. Anisotropy in strength was calculated from the equation (2) below.

Anisotropy=(Flexural strength in direction perpendicular to flow) divided by (flexural strength in direction parallel to flow)    (2)

(9) Fatigue Characteristics

A test piece for flexure (127 mm long, 12.7 mm wide, and 3.2 mm thick) was prepared using the above-mentioned molding machine. A stress was applied to the center of the 50-mm span of the test piece by lowering a head (provided with a load detector) at a constant rate until, within 30 seconds, the strain reached ¼ of the maximum strain in the elastic limit of the test piece. The head was returned to its initial position at the same rate. The procedure of applying a load at a low speed was repeated for 10 minutes. Then, the test piece underwent the flexural test according to ASTM D790. In this way the retention of stiffness was evaluated. The results are shown by ⊚ (higher than 90% retention), ○ (higher than 80% retention), and × (lower than 80% retention).

(10) Ability to Shield Electromagnetic Waves

A square test piece (150 mm×150 mm×1 mm thick) was prepared by injection molding. The test piece was examined for ability to shield electromagnetic waves according to the Advantest method. Attenuation of electromagnetic waves (10–1000 MHz) passing through the test piece was measured using TR17301 (an apparatus to evaluate shielding materials, from Advantest Co., Ltd.) and a spectrum analyzer and a probe antenna. Shielding performance at 300

MHz was evaluated by means of the recorded chart. The results are shown by ⊚ (attenuation higher than 40 dB/1 GHz), ○ (attenuation higher than 35 dB/1 GHz), and × (attenuation lower than 35 dB/1 GHz). It is apparent from Table 1 that, as compared with the resin composition in Comparative Examples, the resin composition of the present invention is superior in flowability and metering stability, and that the resin composition of the present invention yields molded articles which have improved impact strength, heat resistance, and chemical resistance and reduced anisotropy.

The resin composition of the present invention is suitable for thin-walled moldings, particularly thin-walled boxes which are exposed to chemicals.

It is also noted from Tables 2 and 3 that the resin composition incorporated with carbon fiber exhibits improved fatigue properties and produces a better shielding effect. The effect of carbon fiber is enhanced by the liquid crystalline. polymer. Thus the resin composition of the present invention is suitable for housings of mobile computers and telephones.

TABLE 1

|  | Thermoplastic resin (100 parts by weight) | Liquid crystalline polyester (part by weight) | Rate of change in Tg (%) | Diameter of dispersed particles (μm) | Aspect ratio | Flowability (mm) |
| --- | --- | --- | --- | --- | --- | --- |
| Example 1 | PC(a) | LCP1 (10) | 0.1 | 1.4 | 1.5 | 121 |
| Example 2 | PC(a) | LCP2 (10) | 1.8 | 1.0 | 2.5 | 96 |
| Example 3 | PC(a) | LCP3 (10) | 0.3 | 1.3 | 1.8 | 99 |
| Example 4 | PC(a) | LCP3 (10) | 2.1 | 1.4 | 1.7 | 99 |
| Example 5 | PC(a) | LCP3 (20) | 0.8 | 1.2 | 1.6 | 105 |
| Example 6 | PC(a) | LCP1 (5) | 0.1 | 1.2 | 1.5 | 115 |
| Example 7 | PC(a) | LCP3 (30) | 1.5 | 1.2 | 1.7 | 124 |
| Example 8 | PC(a) | LCP2 (10) | 3.3 | 0.6 | 2.2 | 90 |
| Example 9 | PC(a) | LCP1 (10) | 0.1 | 2.5 | 1.4 | 128 |
| Example 10 | PC(a) | LCPI (10) | 0.1 | 3.1 | 1.2 | 126 |
| Example 11 | PC//ABS | LCP2 (10) | 1.6 | 0.5 | 1.8 | 88 |
| Example 12 | PC//ABS | LCP3 (10) | 0.9 | 1.2 | 1.6 | 92 |
| Example 13 | PC//ABS | LCP4 (10) | 0.3 | 1.0 | 1.4 | 95 |
| Example 14 | PPE | LCPI (5) | 0.3 | 1.5 | 1.6 | 92 |
| Example 15 | PPE//PS | LCP1 (10) | 0.2 | 1.7 | 1.6 | 112 |
| Comparative Example 1 | PC(a) | — | — | — | — | 76 |
| Comparative Example 2 | PC(b) | — | — | — | — | 79 |
| Comparative Example 3 | PC//ABS | — | — | — | — | 72 |
| Comparative Example 4 | PPE | — | — | — | — | 68 |
| Comparative Example 5 | PPE//PS | — | — | — | — | 62 |
| Comparative Example 6 | PC(a) | LCP2 (10) | 5.3 | 0.2 | 2.5 | 69 |
| Comparative Example 7 | PC(a) | LCP2 (10) | 5.4 | 0.3 | 2.0 | 65 |
| Comparative Example 8 | PC(a) | LCP2 (10) | 5.1 | 0.6 | 2.1 | 66 |
| Comparative Example 9 | PC(a) | LCP2 (10) | 5.8 | 0.4 | 1.2 | 65 |
| Comparative Example 10 | PC(b) | LCP2 (10) | 7.2 | 0.2 | 1.8 | 72 |
| Comparative Example 11 | PC(b) | LCP2 (10) | 6.8 | 0.5 | 2.0 | 75 |
| Comparative Example 12 | PC(a) | LCP3 (10) | 5.2 | 0.7 | 1.5 | 76 |
| Comparative Example 13 | PC(a) | LCP3 (20) | 5.6 | 0.2 | 1.2 | 61 |
| Comparative Example 14 | PC(a) | LCP1 (10) | 7.2 | 0.2 | 3.6 | 52 |
| Comparative Example 15 | PC | LCP1 (120) | 4.8 | 5.3 | 1.8 | 142 |
| Comparative Example 16 | PC//ABS | LCP1 (30) | 12.4 | 0.1 | 1.0 | 58 |

|  | Set temperature of extruder cylinder (° C.)/Stock temperature (° C.) | Metering stability Sv. (n = 50) | Impact strength (J/m) | Heat resistance | Chemical resistance (min) | Anisotropy (TD/MD) |
| --- | --- | --- | --- | --- | --- | --- |
| Example 1 | 296/300 | 0.1 | 623 | ○ | 30 | 0.89 |
| Example 2 | 261/270 | 0.2 | 109 | ○ | 22 | 0.88 |
| Example 3 | 264/270 | 0.2 | 458 | ○ | 22 | 0.87 |
| Example 4 | 275/280 | 0.2 | 532 | ○ | 18 | 0.87 |
| Example 5 | 266/270 | 0.2 | 223 | ○ | 25 | 0.90 |
| Example 6 | 295/300 | 0.2 | 482 | ○ | 27 | 0.91 |
| Example 7 | 267/270 | 0.2 | 189 | ○ | 29 | 0.91 |
| Example 8 | 255/270 | 0.2 | 102 | ○ | 17 | 0.87 |

TABLE 1-continued

| | | | | | | |
|---|---|---|---|---|---|---|
| Example 9 | 292/295 | 0.3 | 485 | ○ | 26 | 0.86 |
| Example 10 | 293/295 | 0.3 | 429 | ○ | 25 | 0.85 |
| Example 11 | 241/250 | 0.2 | 135 | ○ | 15 | 0.88 |
| Example 12 | 245/250 | 0.2 | 189 | ○ | 18 | 0.85 |
| Example 13 | 248/250 | 0.1 | 296 | ○ | 19 | 0.89 |
| Example 14 | 296/300 | 0.2 | 215 | ○ | 21 | 0.88 |
| Example 15 | 298/300 | 0.2 | 245 | ○ | 22 | 0.89 |
| Comparative Example 1 | 287/300 | 0.7 | 95 | x | 15 | 0.91 |
| Comparative Example 2 | 292/300 | 0.8 | 98 | x | 14 | 0.91 |
| Comparative Example 3 | 238/250 | 0.8 | 120 | x | 13 | 0.94 |
| Comparative Example 4 | 285/300 | 0.7 | 95 | x | 10 | 0.92 |
| Comparative Example 5 | 287/300 | 0.7 | 120 | x | 11 | 0.93 |
| Comparative Example 6 | 270/292 | 0.7 | 64 | x | 12 | 0.83 |
| Comparative Example 7 | 280/305 | 0.7 | 64 | x | 12 | 0.82 |
| Comparative Example 8 | 290/316 | 0.5 | 66 | x | 12 | 0.82 |
| Comparative Example 9 | 310/318 | 0.8 | 62 | x | 12 | 0.78 |
| Comparative Example 10 | 280/291 | 0.9 | 66 | x | 13 | 0.78 |
| Comparative Example 11 | 270/280 | 0.4 | 71 | x | 13 | 0.79 |
| Comparative Example 12 | 270/289 | 0.7 | 65 | x | 12 | 0.80 |
| Comparative Example 13 | 340/344 | 0.8 | 51 | x | 11 | 0.78 |
| Comparative Example 14 | 350/352 | 0.8 | 49 | x | 10 | 0.52 |
| Comparative Example 15 | 310/312 | 0.4 | 76 | x | 12 | 0.49 |
| Comparative Example 16 | 280/335 | 0.8 | 86 | x | 10 | 0.69 |

TABLE 2

| | Thermoplastic resin (100 parts by weight) | Liquid crystalline polyester (part by weight) | Filler (parts by weight) | Rate of change in Tg (%) | Diameter of dispersed particles ($\mu$m) |
|---|---|---|---|---|---|
| Example 16 | PC(a) | LCP1 (10) | GF (20) | 0.2 | 1.2 |
| Example 17 | PC(a) | LCP1 (20) | GF (30) | 0.2 | 1.4 |
| Example 18 | PC(a) | LCP1 (30) | GF (40) | 0.3 | 1.3 |
| Example 19 | PC(a) | LCP3 (10) | GF (20) | 0.4 | 1.1 |
| Example 20 | PC(a) | LCP2 (10) | GF (20) | 1.8 | 1.0 |
| Example 21 | PC(a) | LCP1 (10) | CF (10) | 0.1 | 1.5 |
| Example 22 | PC(a) | LCP1 (10) | CF (10) | 0.1 | 2.1 |
| Example 23 | PC(a) | LCP1 (20) | CF (10) | 0.2 | 1.6 |
| Example 24 | PC(a) | LCP1 (10) | CF (40) | 0.3 | 1.3 |
| Example 25 | PPE | LCP1 (10) | CF (40) | 0.3 | 1.1 |
| Comparative Example 17 | PC(a) | — | GF (20) | — | — |
| Comparative Example 18 | PC(a) | — | GF (40) | — | — |
| Comparative Example 19 | PC(a) | — | CF (10) | — | — |
| Comparative Example 20 | PC(a) | — | CF (40) | — | — |
| Comparative Example 21 | PPE | — | CF (40) | — | — |

TABLE 2-continued

|  | Aspect ratio | Flowability (mm) | Set temperature of extruder cylinder (° C.)/Stock temperature (° C.) | Fatigue properties | Impact strength (J/m) |
|---|---|---|---|---|---|
| Example 16 | 1.6 | 94 | 290/300 | ○ | 189 |
| Example 17 | 1.6 | 95 | 290/300 | ○ | 139 |
| Example 18 | 1.8 | 86 | 289/300 | ⊚ | 126 |
| Example 19 | 1.7 | 89 | 258/270 | ○ | 135 |
| Example 20 | 2.4 | 84 | 254/270 | ○ | 109 |
| Example 21 | 1.4 | 103 | 292/300 | ○ | 201 |
| Example 22 | 1.8 | 109 | 296/300 | ⊚ | 234 |
| Example 23 | 1.5 | 120 | 297/300 | ⊚ | 238 |
| Example 24 | 1.8 | 85 | 285/300 | ⊚ | 168 |
| Example 25 | 1.8 | 65 | 282/300 | ⊚ | 135 |
| Comparative Example 17 | — | 45 | 285/300 | x | 88 |
| Comparative Example 18 | — | 28 | 281/300 | ○ | 92 |
| Comparative Example 19 | — | 58 | 288/300 | x | 88 |
| Comparative Example 20 | — | 30 | 281/300 | ○ | 92 |
| Comparative Example 21 | — | 10 | 280/300 | ○ | 91 |

The amount of filler is based on the total amount (100 parts by weight) of the thermoplastic resin and liquid crystalline polymer.

TABLE 3

|  | Thermoplastic resin (100 parts by weight) | Liquid crystalline polyester (part by weight) | Filler (parts by weight) | Rate of change in Tg (%) | Diameter of dispersed particles (μm) | Aspect ratio | Set temperature of extruder (° C.)/Stock temperature (° C.) | Electro-magnetic wave shielding performance |
|---|---|---|---|---|---|---|---|---|
| Example 26 | PC(a) | LCP1 (5) | CF (10) | 0.1 | 1.2 | 1.7 | 291/300 | ○ |
| Example 27 | PC(a) | LCP1 (20) | CF (30) | 0.4 | 1.3 | 1.8 | 292/300 | ⊚ |
| Comparative Example 22 | PC(a) | — | CF (10) | — | — | — | 285/300 | x |
| Comparative Example 23 | PC(a) | — | CF (30) | — | — | — | 282/300 | ○ |

The amount of filler is based on the total amount (100 parts by weight) of the thermoplastic resin and liquid crystalline polymer.

What is claimed is:

1. A thermoplastic resin composition which comprises 100 parts by weight of thermoplastic resin as component (A) which is at least one species selected from the group consisting of styrene resin, polycarbonate resin, and polyphenylene ether resin, and 0.5–100 parts by weight of liquid crystalline polymer as component (B), said thermoplastic resin component (A) having a glass transition point the rate of change of which satisfies the equation (1) below:

$$\text{Rate of change (\%)} = |(Tg_A - Tg_T)/Tg_A| \times 100 \leq 5 \quad (1)$$

where $Tg_A$ is the glass transition point of the thermoplastic resin as component (A), and $Tg_T$ is the glass transition point attributable to the thermoplastic resin as component (A) in the resin composition, wherein said resin composition contains the liquid crystalline polymer dispersed therein in the form of particles having an aspect ratio (major axis/minor axis) smaller than 3.

2. A thermoplastic resin composition which comprises 100 parts by weight of thermoplastic resin as component (A) which is at least one species selected from the group consisting of styrene resin, polycarbonate resin, and polyphenylene ether resin, and 0.5–100 parts by weight of liquid crystalline polymer as component (B), said thermoplastic resin component (A) having a glass transition point the rate of change of which satisfies the equation (1) below:

$$\text{Rate of change (\%)} = |(Tg_A - Tg_T)/Tg_A| \times 100 \leq 5 \quad (1)$$

where $Tg_A$ is the glass transition point of the thermoplastic resin as component (A), and $Tg_T$ is the glass transition point attributable to the thermoplastic resin as component (A) in the resin composition, wherein the liquid crystalline polymer as component (B) is a liquid crystalline polymer composed of the structural units represented by the formulas (I), (II), (III), and (IV) below

(I)

(II)

(III)

(IV)

where $R_1$ is one or more groups selected from

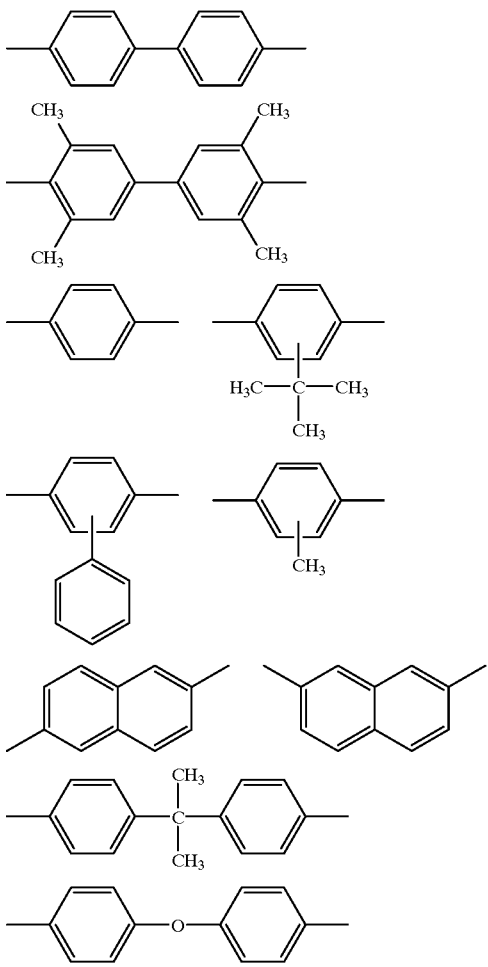

and $R_2$ is one or more groups selected from

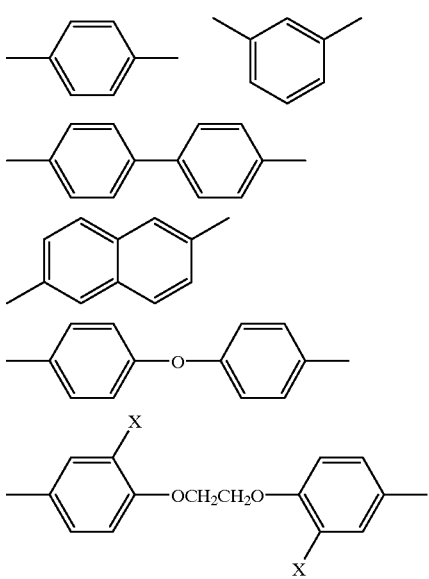

X denotes a hydrogen atom or chlorine atom.

3. A thermoplastic resin composition which comprises 100 parts by weight of thermoplastic resin as component (A) which is at least one species selected from the group consisting of styrene resin, polycarbonate resin, and polyphenylene ether resin, and 0.5–100 parts by weight of liquid crystalline polymer as component (B), said thermoplastic resin component (A) having a glass transition point the rate of change of which satisfies the equation (1) below:

$$\text{Rate of change } (\%)=|(Tg_A-Tg_T)/Tg_A|\times 100 \leq 5 \tag{1}$$

where $Tg_A$ is the glass transition point of the thermoplastic resin as component (A), and $Tg_T$ is the glass transition point attributable to the thermoplastic resin as component (A) in the resin composition, which resin composition further comprises 0.5–300 parts by weight of filler for 100 parts by weight of the total amount of the thermoplastic resin as component (A) and the liquid crystalline polymer as component (B).

4. A process for producing a molded article of the thermoplastic resin composition which comprises 100 parts by weight of thermoplastic resin as component (A) which is at least one species selected from the group consisting of styrene resin, polycarbonate resin, and polyphenylene ether resin, and 0.5–100 parts by weight of liquid crystalline polymer as component (B), said thermoplastic resin component (A) having a glass transition point the rate of change of which satisfies the equation (1) below:

$$\text{Rate of change } (\%)=|(Tg_A-Tg_T)/Tg_A|\times 100 \leq 5 \tag{1}$$

where $Tg_A$ is the glass transition point of the thermoplastic resin as component (A), and $Tg_T$ is the glass transition point attributable to the thermoplastic resin as component (A) in the resin composition, said process comprising melt-processing a thermoplastic resin as component (A), a liquid crystalline resin as component (B), and a filler at a temperature lower than the melting point of the liquid crystalline polymer and higher than the temperature at which the liquid crystalline polymer begins to flow under stress.

5. A thermoplastic resin composition which comprises 100 parts by weight of thermoplastic resin as component (A) which is at least one species selected from the group consisting of styrene resin, polycarbonate resin, and polyphenylene ether resin, and 0.5–100 parts by weight of liquid crystalline polymer as component (B), said thermoplastic resin component (A) having a glass transition point the rate of change of which satisfies the equation (1) below:

$$\text{Rate of change } (\%)=|(Tg_A-Tg_T)/Tg_A|\times 100 \leq 5 \tag{1}$$

where $Tg_A$ is the glass transition point of the thermoplastic resin as component (A), and $Tg_T$ is the glass transition point attributable to the thermoplastic resin as component (A) in the resin composition, wherein said resin composition contains the liquid crystalline polymer dispersed therein in the form of particles having a number-average particle diameter of 0.5–5 μm.

6. A thermoplastic resin composition as defined in claim 3, where said filler is carbon fiber.

7. A process for producing a thermoplastic resin composition according to claim 1, said process comprising melt-mixing a thermoplastic resin as component (a) and a liquid crystalline polymer as component (b) at a temperature lower than the melting point of the liquid crystalline polymer and higher than the temperature at which the liquid crystalline polymer begins to flow under stress.

8. A molded article of the thermoplastic resin composition as defined in any one of claims 1, to 4, said molded article being a machine part, electric and electronic part, or automotive part.

9. A molded article of the thermoplastic resin composition as defined in claim 8, said molded article having a plate-like part or box-like part and also having a thin-wall part thinner than 1.2 mm which accounts for more than 10% of the entire surface area.

* * * * *